(12) United States Patent
Fedullo

(10) Patent No.: US 10,830,351 B2
(45) Date of Patent: Nov. 10, 2020

(54) METHOD FOR DISENGAGING HYDRAULIC PARK

(71) Applicant: Ford Global Technologies, LLC, Dearborn, MI (US)

(72) Inventor: Timothy Fedullo, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 15/899,059

(22) Filed: Feb. 19, 2018

(65) Prior Publication Data

US 2019/0257423 A1 Aug. 22, 2019

(51) Int. Cl.
*B60W 10/18* (2012.01)
*F16H 63/48* (2006.01)
*F16H 63/34* (2006.01)
*F16H 63/30* (2006.01)

(52) U.S. Cl.
CPC ..... *F16H 63/3483* (2013.01); *F16H 63/3016* (2013.01); *F16H 63/3425* (2013.01); *F16H 63/483* (2013.01)

(58) Field of Classification Search
None
See application file for complete search history.

(56) References Cited

U.S. PATENT DOCUMENTS

| 5,807,205 | A | 9/1998 | Odaka et al. | |
|---|---|---|---|---|
| 9,132,811 | B2 | 9/2015 | Dufford et al. | |
| 9,216,719 | B2 | 12/2015 | Hasegawa et al. | |
| 10,023,191 | B2 * | 7/2018 | Fontvieille | B60W 10/08 |
| 2014/0297139 | A1 | 10/2014 | Clarke et al. | |
| 2015/0217733 | A1 * | 8/2015 | Ries | B60W 10/10 |
| | | | | 192/219.5 |
| 2015/0314770 | A1 * | 11/2015 | Kitabatake | B60K 6/383 |
| | | | | 477/9 |

* cited by examiner

*Primary Examiner* — Charles A Fox
*Assistant Examiner* — Ryan P Dodd
(74) *Attorney, Agent, or Firm* — Vincent Mastrogiacomo; Brooks Kushman P.C.

(57) ABSTRACT

A hydraulically controlled park system disengages a parking pawl in response to engagement of particular shift elements. When the vehicle is one a grade, greater force may be required to dis-engage the pawl, potentially leading to a failure to dis-engage. The controller avoids this failure by engaging an uphill gear ratio and controlling the transmission input torque to transfer load from the parking pawl to the gearing prior to engaging the shift elements that dis-engage the pawl. Following dis-engagement of the parking pawl, the transmission is in a tie-up condition in which the output shaft is held stationary by shift elements. The controller transitions from this tie-up condition to the selected gear ratio by releasing shift elements.

20 Claims, 5 Drawing Sheets

METHOD FOR DISENGAGING HYDRAULIC PARK

TECHNICAL FIELD

This disclosure relates to the field of control systems for automatic transmissions for motor vehicles. More particularly, the disclosure relates to a method of disengaging a hydraulically controlled parking mechanism.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low.

SUMMARY OF THE DISCLOSURE

A method of operating a vehicle includes responding to de-selection of Park while a vehicle is on a grade by engaging a first shift element, controlling a transmission input torque, engaging a second shift element, and then releasing one of the first and second shift elements. The first shift element establishes a first gear ratio selected to propel the vehicle up the grade. The transmission input torque is controlled to unload a parking pawl. Engaging the second shift element disengages the parking pawl and creates a transmission tie-up. Releasing one of the first and second shift elements establishes a second gear ratio which is selected based on a position of a shift selector. The first and second gear ratios may be the same or may be different.

A transmission includes a plurality of shift elements, a park system, and a controller. The park system is configured to disengage a parking pawl in response to engagement of a first subset of the plurality of shift elements. The controller is programmed to respond to a command to de-select Park by engaging a second subset of the plurality of shift elements and control a transmission input torque to unload the parking pawl. Engaging the second subset of shift elements establishes a first gear ratio which may be based on grade. After the parking pawl is unloaded, the controller may engage the first subset of the shift elements while maintaining engagement of the second subset of the shift elements, thereby disengaging the parking pawl and establishing a tie-up condition. Then, the controller may release at least one shift element to transition from the tie-up condition to a second gear ratio, which may be selected based on a command from a shift selector.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
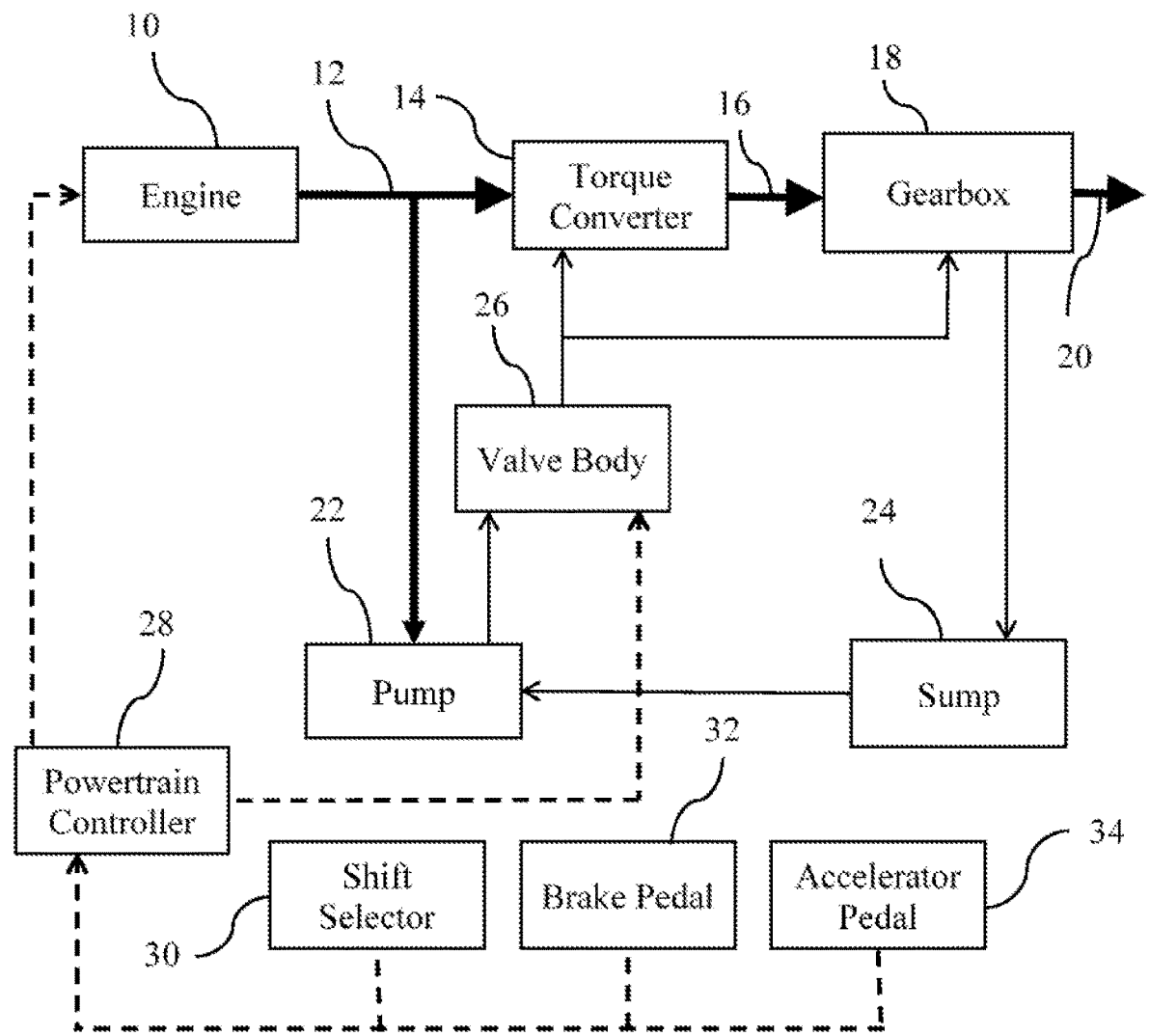
FIG. 1 is a schematic diagram of an automotive powertrain.

FIG. 1 schematically illustrates a vehicle powertrain. Bold solid lines represent mechanical power flow connections. Thin solid lines represent the flow of hydraulic fluid. Dashed lines represent the flow of information signals. Propulsive power is supplied by internal combustion engine 10 at transmission input shaft 12. Fluid coupling 14 includes an impeller driveably connected to input shaft 12 and a turbine driveably connected to turbine shaft 16. Power is transmitted from the impeller to the turbine via moving fluid whenever the impeller rotates faster than the turbine. Fluid coupling 14 may be a torque converter which also includes a stator which redirects the fluid when the impeller is rotating substantially faster than the impeller such that the turbine torque is a multiple of the impeller torque. Gearbox 18 includes gearing and shift elements configured to establish various power flow paths between turbine shaft 16 and output shaft 20. Each power flow path may be established by engaging a specified subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

Most of the shift elements within gearbox 18 are engaged by supplying hydraulic fluid at an elevated pressure to a clutch apply chamber. (Gearbox 18 may also include passively engaged one-way clutches or electrically actuated elements.) Each shift element may include a clutch pack having friction plates splined to one component and interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 22, driven by input shaft 12, draws fluid from sump 24 and delivers it at an elevated pressure to valve body 26. Valve body 26 delivers the fluid to the clutch apply chambers at a pressure controlled in accordance with signals from powertrain controller 28. In addition to the fluid provided to clutch apply chambers, valve body provides fluid for lubrication and provides fluid to fluid coupling 14. The fluid eventually drains from gearbox 20 back to sump 24 at ambient pressure.

Powertrain controller 28 receives signals from a variety of sensors. Among these sensors are a shift selector 30, a brake pedal 32 and an accelerator pedal 34 which are manipulated by a driver to indicate desired powertrain behavior. In addition to sending control signals to valve body 26, powertrain controller 28 also sends control signals to engine 10.

Figure 2:
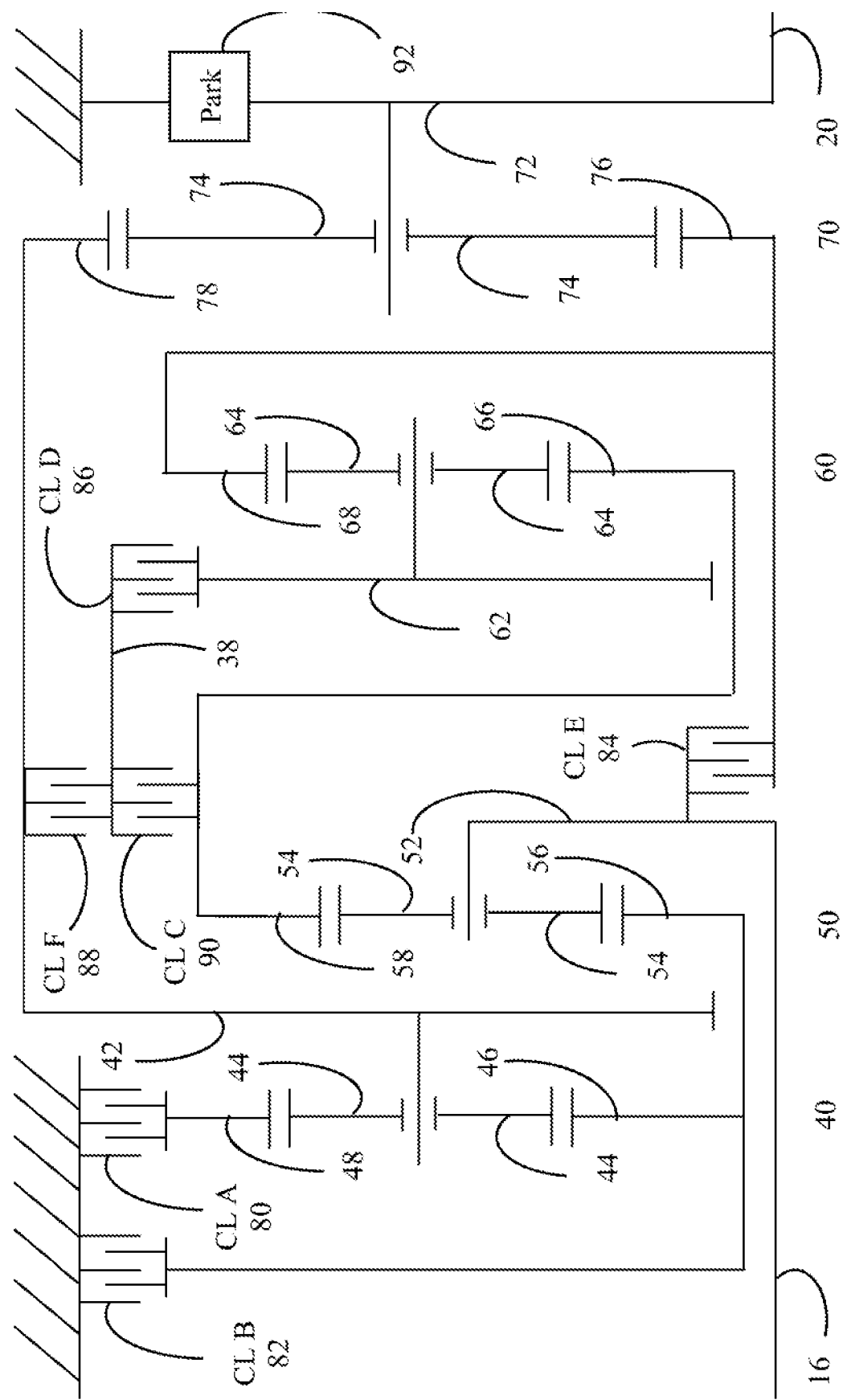
FIG. 2 is a schematic diagram of a transmission gearing arrangement suitable for the gearbox of the powertrain of FIG. 1.

An example gearbox is schematically illustrated in FIG. 2. The transmission utilizes four simple planetary gear sets 40, 50, 60, and 70. Sun gear 46 is fixedly coupled to sun gear 56, carrier 42 is fixedly couple to ring gear 78, ring gear 58 is fixedly coupled to sun gear 66, ring gear 68 is fixedly coupled to sun gear 76, turbine shaft 16 is fixedly coupled to carrier 52, and output shaft 20 is fixedly coupled to carrier 72. Ring gear 48 is selectively held against rotation by brake 80 and sun gears 46 and 56 are selectively held against rotation by brake 82. Turbine shaft 16 is selectively coupled to ring gear 68 and sun gear 76 by clutch 84. Intermediate shaft 38 is selectively coupled to carrier 62 by clutch 86, selectively coupled to carrier 42 and ring gear 78 by clutch 88, and selectively coupled to ring gear 58 and sun gear 66 by clutch 90. A suggested ratio of gear teeth for each planetary gear set is listed in Table 1.

TABLE 1

| | |
|---|---|
| Ring 48/Sun 46 | 2.20 |
| Ring 58/Sun 56 | 1.75 |
| Ring 68/Sun 66 | 1.60 |
| Ring 78/Sun 76 | 3.70 |

As shown in Table 2, engaging the clutches and brakes in combinations of four establishes ten forward speed ratios and one reverse speed ratio between turbine shaft 16 and output shaft 20. An X indicates that the clutch is required to establish the speed ratio. An (X) indicates the clutch can be applied but is not required to establish the power flow path. When the gear sets have tooth numbers as indicated in Table 1, the speed ratios have the values indicated in Table 2.

TABLE 2

| | A 80 | B 82 | C 90 | D 86 | E 84 | F 88 | Ratio | Step |
|---|---|---|---|---|---|---|---|---|
| Rev | X | X | | X | | X | −4.79 | 102% |
| Park | X | X | | X | | | | |
| 1$^{st}$ | X | X | | (X) | X | | 4.70 | |
| 2$^{nd}$ | X | X | X | X | | | 2.99 | 1.57 |
| 3$^{rd}$ | X | | X | X | X | | 2.18 | 1.37 |
| 4$^{th}$ | X | | X | X | | X | 1.80 | 1.21 |
| 5$^{th}$ | X | | X | | X | X | 1.54 | 1.17 |
| 6$^{th}$ | X | | | X | X | X | 1.29 | 1.19 |
| 7$^{th}$ | | | X | X | X | X | 1.00 | 1.29 |
| 8$^{th}$ | | X | | X | X | X | 0.85 | 1.17 |
| 9$^{th}$ | | X | X | | X | X | 0.69 | 1.24 |
| 10$^{th}$ | | X | X | X | | X | 0.64 | 1.08 |

Parking pawl 92 selectively couples output shaft 20 to the transmission case to prevent vehicle movement when the vehicle is parked. Unlike shift elements 80-90, parking pawl 92 is designed to remain engaged without any external power once engaged.

Figure 3:
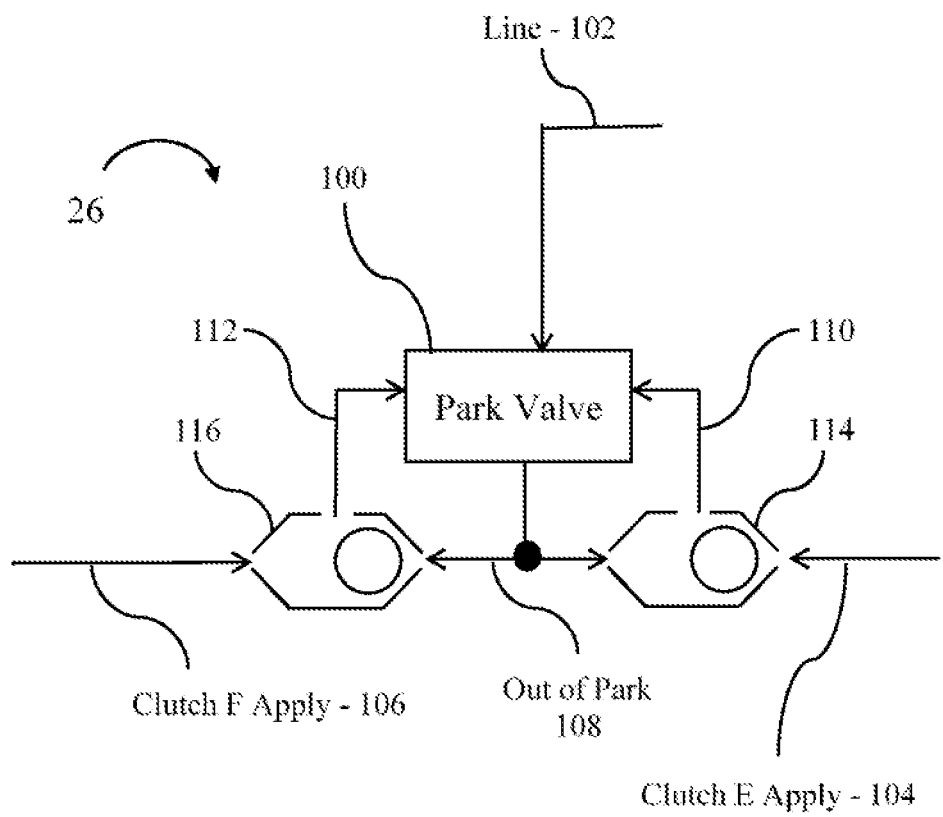
FIG. 3 is a schematic diagram of a park subsystem of a hydraulic control system for the transmission of FIG. 1.

FIG. 3 schematically illustrates the park control subsystem of valve body 26. A spool of park valve 100 is mechanically linked to the park mechanism 92, such that movement of the spool in one direction engages the park mechanism and movement in the opposite direction disengages the park mechanism. The structure of park valve 100 is described in more detail in U.S. Pat. No. 9,683,666 which is hereby incorporated by reference herein. A spring within the park mechanism biases the system toward engagement. Also, pressure in the line pressure circuit 102 acts on an area of the spool to bias the system toward park engagement. The hydraulic control system also includes a set of clutch apply circuits that are routed to the apply chambers of each of the hydraulically controlled shift elements. The pressures of fluid in the clutch apply circuits are controlled to levels between zero and the pressure in the line pressure circuit 102. These clutch apply circuits include circuits 104 and 106 that engage shift elements E and F respectively. Park valve 100 fluidly connects an out-of-park circuit 108 to the line pressure circuit 102 when park is disengaged and vents out-of-park circuit 108 when park is engaged. Hydraulic circuits 110 and 112 bias the park valve toward the disengaged position. Check valve 114 fluidly connects circuit 110 to either clutch B apply circuit 104 or out-of-park circuit 108, whichever has the higher pressure. Similarly, check valve 116 fluidly connects circuit 112 to either clutch D apply circuit 106 or out-of-park circuit 108, whichever has the higher pressure.

When the park mechanism is engaged, both the park mechanism itself and pressure in line pressure circuit 102 tend to hold park valve 100 in the engaged position. To disengage the park mechanism, clutches E and F are engaged by commanding full pressure to apply circuits 104 and 106. Check valves 114 and 116 fluidly connect these clutch apply circuits to circuits 110 and 112 respectively. Pressure in circuits 110 and 112 force the park valve into the disengaged position. (The total area upon which circuits 110 and 112 act is greater than the area on which line pressure circuit 102 acts.) Once in the disengaged position, park valve 100 fluidly connects out-of-park circuit 108 to line pressure circuit 102. As a result, the park valve tends to stay in the disengaged position even if clutches E and F are later released. To re-engage the park mechanism, the pressure in line pressure circuit 102 is reduced to a level at which the park mechanism spring forces the park valve to the engaged position.

When the vehicle is parked on a grade, the vehicle weight tends to place a load on parking pawl 92. The load on the parking pawl increases the force that is necessary to disengage the pawl. In some cases, the load may prevent park disengagement even as clutches 84 and 88 are engaged. Even when the load does not prevent disengagement of park, it may result in objectionable noise and vehicle movement upon disengagement. The load is transmitted from the vehicle wheels to the parking pawl by the driveshaft and half-shafts which are twisted (called wind-up) as a result. When the parking pawl is released under load, the energy stored in the driveshaft and half-shafts is suddenly released, causing the unpleasant noise.

Figure 4:
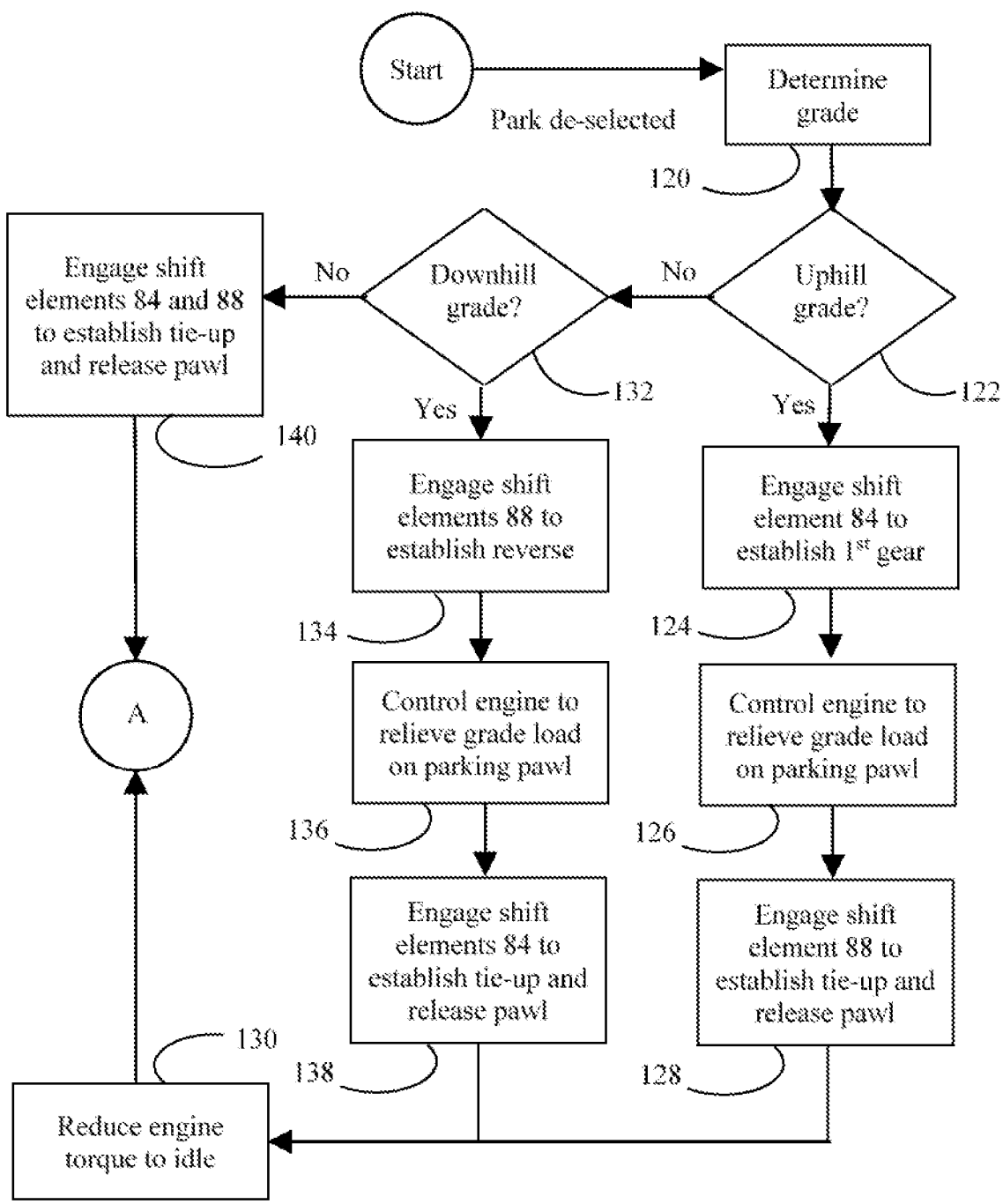
FIG. 4 is a flowchart for a first portion of a process for disengaging the parking pawl of the transmission of FIG. 1.
Figure 5:
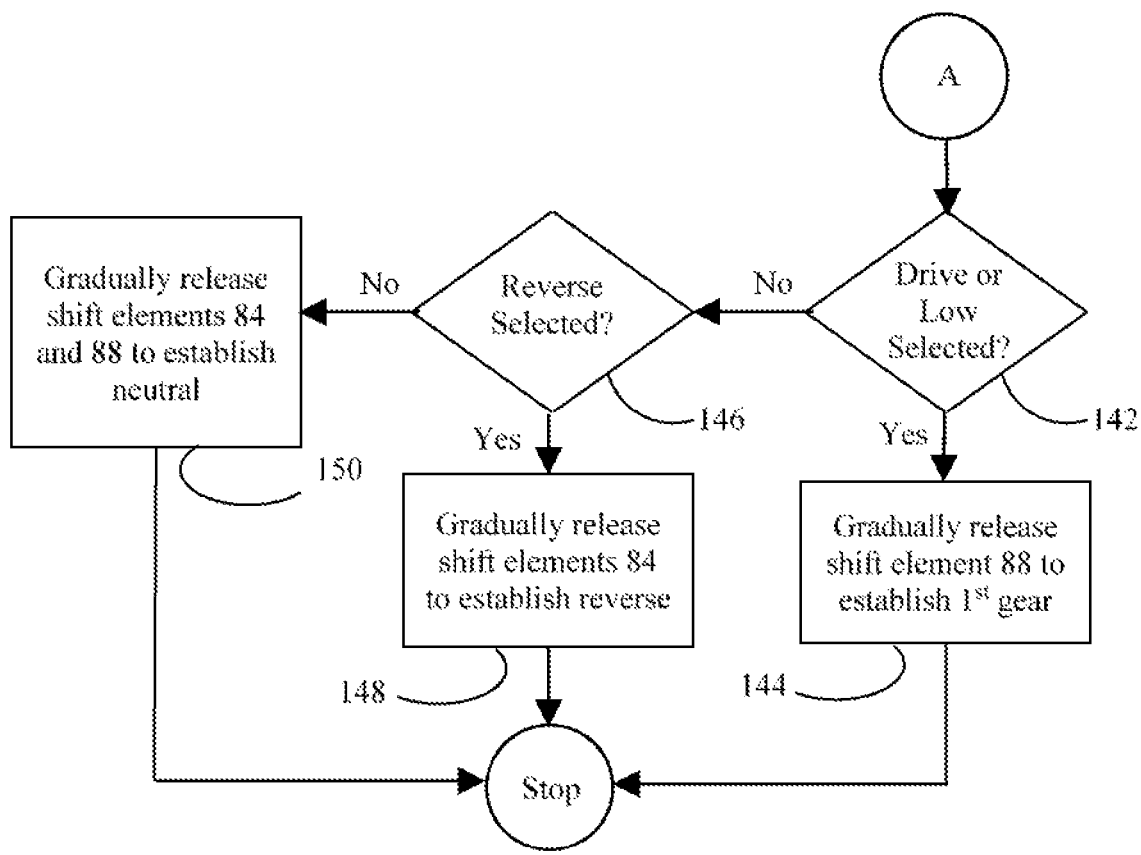
FIG. 5 is a flowchart for a second portion of the process of FIG. 4.

FIGS. 4 and 5 illustrate a process for transitioning from park to either reverse or drive while avoiding the unpleasant noise and ensuring that load on the parking pawl does not prevent disengagement of park. The process begins in response to park being de-selected by a driver moving shift selector 30 from the position for Park to another position, such as Reverse, Neutral, Drive, or Low. As shown in Table 2, shift elements 80, 82, and 86 are already engaged while the vehicle is in Park with the engine running. At 120, the controller determines the road grade. This may be accomplished, for example, using an accelerometer. If the controller determines, at 122, that the vehicle is parked on an uphill grade, then the controller commands engagement of shift element 84 at 124 to establish the $1^{st}$ gear ratio. An uphill grade may be defined as any road grade greater than predefined positive threshold. At 126, the controller controls the engine torque to a torque level that relieves the load on the parking pawl. In other words, the torque is adjusted to the level required to hold the vehicle on the grade in $1^{st}$ gear. If the vehicle is a hybrid electric vehicle, the controller may alternatively control an electric motor to adjust the transmission input torque to the required degree. After the parking pawl is unloaded, the controller engages shift element 88 at 128. This places the transmission in a tie-up condition in which both turbine shaft 16 and output shaft 20 are held against rotation relative to the transmission case. This also causes release of parking pawl 92 since shift element 84 is already engaged. With the transmission in this tie-up condition, the engine torque may be reduced to idle torque at 130 without the vehicle tending to roll backwards down the grade.

If the controller determines at 122 that the vehicle is not parked on an uphill grade, then the controller checks at 132 whether the vehicle is parked on a downhill grade. A downhill grade may be defined as any road grade less than predefined negative threshold. If the vehicle is parked on a downhill grade, then an analogous sequence of steps is carried out at 134-138. The controller commands engagement of shift element 88 at 134 to establish the reverse gear ratio. At 136, the controller controls the engine torque, or other source of transmission input torque, to a level that relieves the load on the parking pawl. After the parking pawl is unloaded, the controller engages shift element 84 at 138 to place the transmission in a tie-up condition and release parking pawl 92. With the transmission in this tie-up condition, the engine torque may be reduced to idle torque at 130 without the vehicle tending to roll forward down the grade.

If the vehicle is not on a downhill grade at 132, then the vehicle is assumed to be on relatively level terrain. At 140, the controller commands engagement of shift elements 84 and 88. This disengages parking pawl 92 and places the transmission in a tie-up condition.

Independent of road grade, the controller reaches a condition in which shift elements 80, 82, 84, 86, and 88 are all engaged placing the transmission in a tie-up condition with parking pawl 92 disengaged. Referring now to FIG. 5, from this condition, the controller checks at 142 whether Drive or Low is selected via shift selector 30. If so, the controller commands release of shift element 88 at 144 to place the transmission in $1^{st}$ gear. As shift element 88 is gradually released, the wind-up in the driveshaft and half-shafts gradually changes from the level associated with the road grade to the level associated with the output torque in $1^{st}$ gear with the engine idling, otherwise known as the forward creep torque. These two levels of wind-up may be in the same direction or in opposite directions depending on the road grade. Since the transition is gradual, there is no sudden release of stored energy to cause an unpleasant noise. If the shift selector is not in Drive or Low at 142, then the controller checks at 146 whether the shift selector is in Reverse. If so, the controller commands the gradual release of shift element 84 to transition into the reverse ratio. If not, then the shift selector must be in Neutral. Therefore, the controller releases both shift elements 84 and 88 to establish neutral. In a neutral, the transmission output is free to rotate and negligible torque is transmitted between turbine shaft 16 and output shaft 20 (some torque may be transmitted due to parasitic drag).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of operating a vehicle comprising:
    in response to de-selection of Park via a shift selector while the vehicle is on a grade,
        engaging a first shift element to establish a first gear ratio selected to propel the vehicle up the grade,
        in response to engaging the first shift element, controlling transmission input torque to a first value that corresponds with unloading a parking pawl, pawl and maintaining a position of the vehicle on the grade while the first gear ratio is established,
        in response to controlling the transmission input torque to the first value, engaging a second shift element to disengage the parking pawl and create a transmission tie-up,
        in response to creating the transmission tie-up, adjusting the torque at the transmission input during the tie-up to a second value that corresponds with an idle torque, and
        in response to selection of a second gear ratio based on the shift selector and the transmission tie-up, gradually releasing one of the first and second shift elements to establish the second gear ratio.

2. The method of claim 1 wherein the first gear ratio and the second gear ratio are the same.

3. The method of claim 1 wherein the first gear ratio and the second gear ratio are different.

4. A method of operating a vehicle comprising:
in response to de-selection of Park,
engaging a first shift element to establish a first gear ratio,
in response to engaging the first shift element, controlling transmission input torque to a first value that corresponds with unloading a parking pawl and maintaining a position of the vehicle on a grade while the first gear ratio is established,
in response to controlling the transmission input torque to the first value, engaging a second shift element to disengage the parking pawl and create a transmission tie-up,
in response to creating the transmission tie-up, adjusting the torque at the transmission input during the tie-up to a second value that corresponds with an idle torque, and
in response to selection of a second gear ratio and the transmission tie-up, gradually releasing one of the first and second shift elements to establish the second gear ratio.

5. The method of claim 4 wherein the first gear ratio is selected based on a road grade on which the vehicle is parked.

6. The method of claim 4 wherein Park is de-selected via a shift selector and the second gear ratio is selected based on a position of the shift selector after de-selecting Park.

7. The method of claim 4 wherein the first gear ratio and the second gear ratio are the same.

8. The method of claim 4 wherein the first gear ratio and the second gear ratio are different.

9. A transmission comprising:
a plurality of shift elements;
a park system configured to engage and disengage a parking pawl; and
a controller programmed to, in response to a command to de-select Park,
engage a first subset of the plurality of shift elements to establish a first gear ratio,
in response to establishing the first gear ratio, control a transmission input torque to a first value that corresponds with unloading the parking pawl and maintaining a position of the vehicle on a grade while the first gear ratio is established,
in response to controlling the transmission input torque to the first value, engaging a second subset of the plurality of shift elements to disengage the parking pawl and create a transmission tie-up,
in response to creating the transmission tie-up, adjusting the torque at the transmission input during the tie-up to a second value that corresponds with an idle torque, and
in response to selection of a second gear ratio and the transmission tie-up, gradually releasing one of the first and second subsets of the plurality of shift elements to establish the second gear ratio.

10. The transmission of claim 9 wherein the first gear ratio is selected based on a grade.

11. The transmission of claim 9 wherein the second gear ratio is selected based on a command from a shift selector.

12. The method of claim 1, wherein the transmission input torque is generated by an engine.

13. The method of claim 1, wherein the transmission input torque is generated by an electric motor.

14. The method of claim 1, wherein the first value is greater than the second value.

15. The method of claim 4, wherein the transmission input torque is generated by an engine.

16. The method of claim 4, wherein the transmission input torque is generated by an electric motor.

17. The method of claim 4, wherein the first value is greater than the second value.

18. The transmission of claim 9, wherein the transmission input torque is generated by an engine.

19. The transmission of claim 9, wherein the transmission input torque is generated by an electric motor.

20. The transmission of claim 9, wherein the first value is greater than the second value.

* * * * *